United States Patent [19]

Nickles

[11] Patent Number: 4,631,410

[45] Date of Patent: Dec. 23, 1986

[54] METHOD AND APPARATUS FOR MEASUREMENT OF RADIOACTIVITY OVER AN EXTENDED RANGE

[75] Inventor: Robert J. Nickles, Madison, Wis.

[73] Assignee: Wisconsin Alumni Research Foundation, Madison, Wis.

[21] Appl. No.: 657,397

[22] Filed: Oct. 3, 1984

[51] Int. Cl.$^4$ .................. G01T 1/167; G01T 1/161
[52] U.S. Cl. .................. 250/363 R; 250/207; 250/361 R; 250/362
[58] Field of Search ............ 250/207, 361 R, 362, 250/363 R, 363 SR; 313/105 R, 103 R

[56] References Cited

U.S. PATENT DOCUMENTS

| | | | |
|---|---|---|---|
| 2,772,368 | 11/1956 | Scherbatskoy | 313/536 |
| 3,004,167 | 10/1961 | Owen | 250/369 |
| 3,721,824 | 3/1973 | Bristol | 250/369 |
| 3,798,448 | 3/1974 | Menefee et al. | 250/361 R |
| 3,944,832 | 3/1976 | Kalish | 250/361 R |
| 4,217,496 | 8/1980 | Daniels et al. | 250/369 |

FOREIGN PATENT DOCUMENTS 101581  8/1981  Japan .................. 250/362

OTHER PUBLICATIONS

M. I. Kudryautsev, A. S. Melioranskii, I. A. Savenko and V. M. Shamolin, "Isolation of a Cerenkov Flash in a CsI (Tl) Scintillation Crystal", *Pribory i Tekhnika Eksperimenta*, No. 4, (Jul.-Aug., 1973), pp. 85-87.
B. G. Dunavant et al., "A Large-Volume 4π Liquid Scintillation Detector", *International Journal of Applied Radiation and Isotopes*, (1960), vol. 8, pp. 223-227.
G. L. Brownell et al., "Large Plastic Scintillators for Radioactivity Measurement", *Health Physics*, Pergamon Press, (1961), vol. 5, pp. 27-36.
J. D. Cook et al., "Evaluation and Use of a Large Plastic Scintillator for Gamma Counting", *J. Lab. & Clin. Med.*, vol. 61, No. 2, (Feb., 1963), pp. 317-323.
A. H. Smith et al., "A Large 4π Plastic Scintillator-Detector with Clinical Applications", *International Journal of Applied Radiation and Isotopes*, (1967), vol. 18, pp. 647-652.

Primary Examiner—Alfred E. Smith
Assistant Examiner—Constantine Hannaher
Attorney, Agent, or Firm—Isaksen, Lathrop, Esch, Hart & Clark

[57] ABSTRACT

Radioactive specimens are placed in the well (12) of a plastic scintillator body (11), and the light flashes from the scintillator body (11) are picked up by a photomultiplier tube (13). The anode (44) and dynodes (43) of the photomultiplier tube (13) are electrically isolated and a selected biasing voltage is provided across the cathode (42) and dynodes to operate the photomultiplier tube in its linear range at the activity level of the specimen. At high activity levels, the current flowing from the anode (44) is measured by an electrometer (21) to determine a value which is directly related to the activity of the specimen, whereas at lower activity levels where anode current is not accurately measurable, the pulses at the last dynode (50) are counted to determine the scintillation rate and thereby the activity level of the specimen.

17 Claims, 3 Drawing Figures

METHOD AND APPARATUS FOR MEASUREMENT OF RADIOACTIVITY OVER AN EXTENDED RANGE

BACKGROUND OF THE INVENTION

1. Field of the Invention

This invention pertains generally to the field of devices and methods by which the activity of a radioactive sample is measured, and pertains particularly to the measurement of preparations used in nuclear medicine and related research.

BACKGROUND ART

Nuclear medicine clinics and related research facilities must regularly assay the activity of their radiopharmaceuticals, which include a variety of gamma ray or positron emitting materials. The activity levels for the materials commonly seen in nuclear medicine laboratories varies from hundreds of millicuries for materials used to provide therapeutic doses, as in the treatment of cancer, to microcuries for materials used as radioactive tracers. (1 curie=$3.7 \times 10^{10}$ becquerel) A high pressure argon gas ionization chamber is the standard instrument used to measure radioactivity over this range, with the accuracy of the instrument being poorest at the low end of its activity range (e.g., about 20% uncertainty at 1 microcurie). The typical ionization chamber has a deep-well configuration with a two inch (50 mm) bore into which small samples and syringes can be introduced. Since the ionization current induced by the radioactive emissions passing through the ionization chamber is measured, it is not possible to discriminate gamma energy from the radioactive source.

Conventional ionization chamber instruments are not capable of accurately measuring radioactivity levels below about 1 microcurie. If radioactivity levels in the 1 nanocurie to 1 microcurie range must be assayed, as in diluted radiotracer measurements, then a sodium iodide scintillation well-counter is generally employed. With this type of instrument, it is possible to perform energy discrimination on the source using differential pulse height analysis. The sample size for sodium iodide well-counters is usually quite small, limited to a few milliliters, preventing the use of the device in situations where it would be desirable to assay a large sample having relatively low levels of radioactivity. An additional limitation of a standard sodium iodide well counter is that the 250 nanosecond photofluorescent decay time of sodium iodide limits the useful counting rate of the well-counter to less than a few hundred kHz, causing the instrument to saturate when attempting to measure a sample having activities above a few microcuries.

Many nuclear medicine and biological science studies involve the following of a radioactive tracer as it is diluted in ever increasing "pools". For example, a common test performed is the estimation of the total blood volume in a patient by labeling a milliliter of whole blood with 100 microcuries of $^{51}Cr$ which firmly binds to the red blood cells. When the labeled blood sample is reinjected into the blood stream, it mixes uniformly with the total blood volume (generally about 5 liters). By removing a second 1 milliliter sample of the patient's blood a half hour later, the total blood volume can be measured as a ratio of the initial total activity to the activity of the second sample. Because of the 5,000-fold dilution in the activity of the samples, an ionization chamber is required for the initial measurement and a scintillation well-counter is employed for the final assay of the diluted blood sample. The two detectors must be cross-calibrated with standard stock solutions of varying dilutions. Performing such interdetector calibrations is time consuming for the laboratory technician and is a source of potential error if the calibration measurements are made improperly.

While the ionization chamber and scintillation well-counter can be used to measure a wide range of sample activities, the range of activity levels of the two instruments over which they measure accurately do not overlap well. Generally, ionization chambers provide satisfactory accuracy in the 10 microcurie to 100 millicurie range, whereas well-counters are accurate in the 100 picocurie to 1 microcurie range. Some uncertainty is thus encountered in using either or both instruments to measure activity levels in the 1 to 10 microcurie range.

SUMMARY OF THE INVENTION

The radioactivity detection apparatus of the present invention provides accurate measurements of activity levels over an extended range, with consistent accuracy obtainable at activity levels as low as a few hundred picocuries and as high as hundreds of millicuries. This accuracy is provided with a single device which does not require recalibration or cross-calibration between measurements of specimens of widely varying activities, and thereby allows the streamlining of many tracer tests, as well as minimizing a significant source of error.

The detector apparatus in accordance with the invention utilizes a body of scintillator material formed with a central well into which the specimen is placed. The scintillator body preferably is formed of a plastic in which scintillator materials of known types have been incorporated, allowing large well sizes to be obtained economically, while permitting sufficient energy selectivity for dual isotope discrimination. A photomultiplier tube is mounted to receive light emitted from the plastic scintillator resulting from interactions with gamma rays. The photomultiplier tube converts the bursts of photon energy from the scintillator to pulses of electrons which strike the several dynodes of the tube and ultimately reach the anode. The anode is electrically isolated from the dynodes and is connected to ground through an electrometer to allow measurement of the current flowing from the anode. At high activity levels, the anode current is proportional to the number of photons reaching the photomultiplier tube from the scintillator per unit time, which in turn is proportional to the rate at which gamma rays are emitted from the specimen in the well of the scintillator. At lower activity levels, the pulses of electrons produced by the photomultiplier tube in response to a packet of photons received from the scintillator are sufficiently spaced in time from one another to be counted by processing circuitry. In a preferred embodiment, the voltage pulses produced at the last dynode before the anode are supplied to pulse counting circuitry which provides an output signal proportional to the number of pulses per unit time. The pulse rate at the low activity levels is then proportional to the activity of the radioactive specimen in the scintillator well.

Of particular significance is the discovery that, in accordance with the present invention, the data obtained at intermediate activity levels by measuring the current from the anode and by counting pulses at a dynode can be used to calibrate the two measurement modes with one another.

The dynodes are biased with a voltage dividing resistor network, with the accelerating voltage applied from the cathode and across the dynode resistor series to the anode being adjustable. In this manner, if the activity level of the specimen is such that the instrument initially saturates, the voltage applied to the biasing network can be reduced until the photomultiplier tube is operating in its linear range. Adjustment of the applied voltage level can be automatically controlled so that the device always operates in its linear range. In addition, the selection of the pulse counting or anode current mode of measurement can be similarly made automatically to accommodate to the sample being measured, as by control from a programmed computer, with the computer further applying predetermined data or corrective algorithms to process the current or pulse rate data from the photomultiplier tube and provide an output to the operator directly indicating the radioactivity level of the sample.

Further objects, features and advantages of the invention will be apparent from the following detailed description when taken in conjunction with the accompanying drawings showing a preferred embodiment of the invention.

BEST MODE FOR CARRYING OUT THE INVENTION

Figure 1:
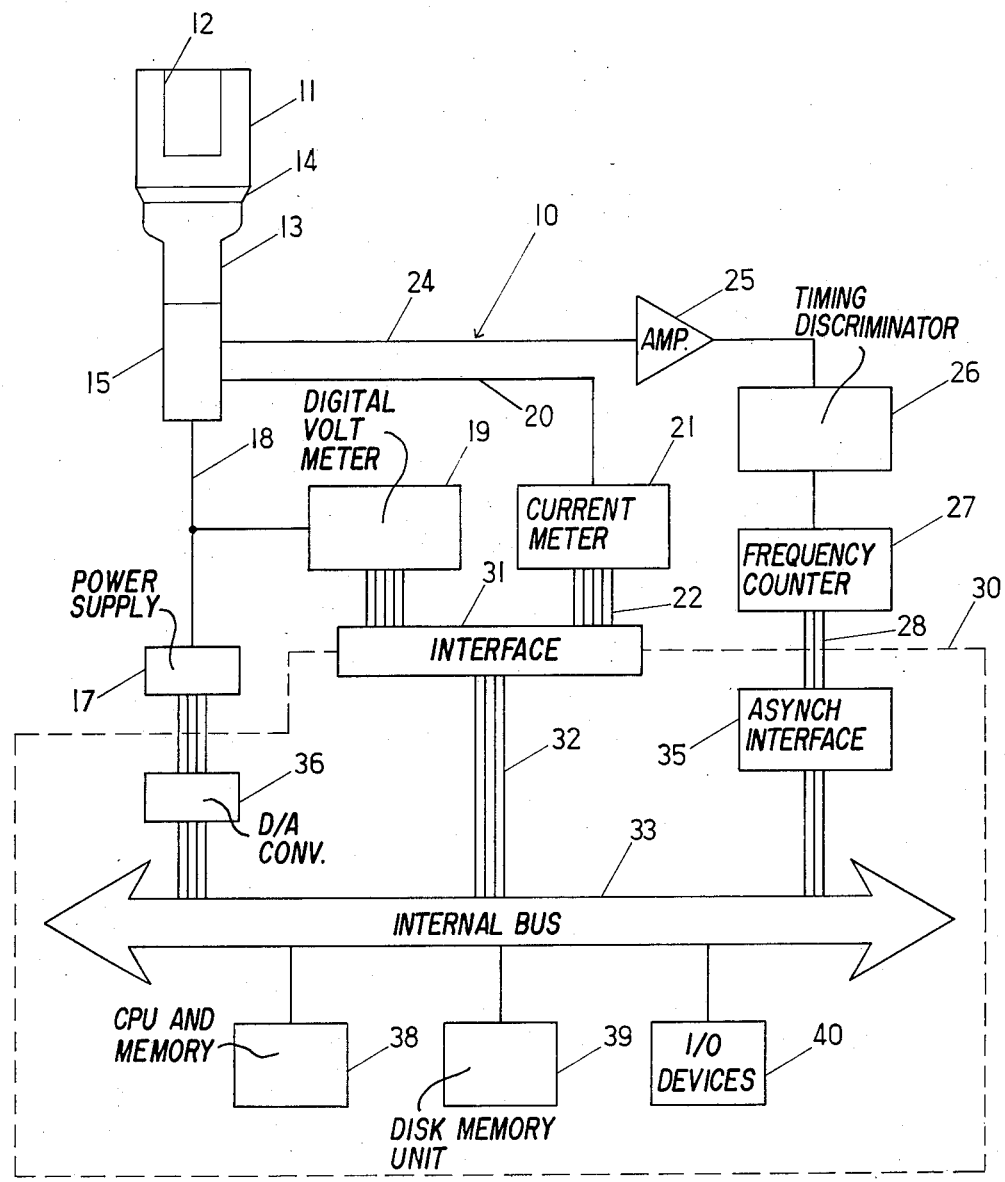
FIG. 1 is a schematic view of the major components of apparatus for measurement of radioactivity over an extended range in accordance with the invention.

With reference to the drawings, a schematic view of the components of the radiation measurement apparatus of the invention is shown generally at 10 in FIG. 1. The components of the detector 10 include a scintillation body 11 having a central, cylindrical well 12 in which a specimen can be inserted, a photomultiplier tube 13, and, in the embodiment shown, a light transmitting adapter 14 of transparent material (e.g., methyl methacrylate) which transmits the scintillation flashes from the detector body 11 to the photomultiplier tube. In accordance with standard practice, the scintillator detector body and photomultiplier tube would be surrounded and shielded by sufficient lead to minimize noise from ambient radiation, and noise generated in the photomultiplier tube itself may be minimized by providing a cooling jacket to the tube to reduce its temperature.

High voltage power is supplied to the base 15 of the photomultiplier tube 13 from a variable high voltage supply 17. The voltage supplied will typically be in the range of 400 to 1,500 volts. Preferably, the voltage on the line 18 from the power supply 17 is monitored by a digital volt meter 19. The current flowing from the anode of the tube 13 is supplied on a line 20 to an electrometer or digital current meter 21 (capable of measuring picoampere current levels) which measures the current flow and provides a digital output signal indicative thereof on lines 22. The voltage pulse output signal from one of the dynodes of the tube, preferably the last dynode before the anode, is provided on a line 24 through a timing and filtering amplifier 25 (e.g., Ortec 474) to a timing discriminator 26 (e.g., El Scint STD), the output of which is supplied to a megahertz frequency counter 27 (e.g., Ortec 778-719) which provides an output signal indicative of the pulse frequency on digital output lines 28. Such equipment is preferred to allow operation over a counting range of a few Hz to a few MHz with background counting rates of about 10 Hz. For example, in 100 seconds of counting time, the background will equal approximately 1000 counts +30 counts, so that a source resulting in 100 counts can be detected, allowing a specimen activity level as low as 30 picocurie to be detected with a 100 second counting period. It is apparent that the counting period can readily be selected to most appropriately suit the activity level of the sample.

The electrometer or picoammeter 21 and the counter 27 may be instruments of the type that allow direct read out of data to a technician who can then use the raw data on anode current, pulse count rate, or both, to determine the radioactivity level of the specimen in the well 12 by comparison with tables determined by using the apparatus to measure the activity of standard sources. The technician may also manually adjust the high voltage source 17 to bring the photomultiplier tube into its linear range when necessary. Alternatively, the data from the electrometer 21 and counter 27 can be provided as digital signals for input to a computer system, shown generally within the dashed line labeled 30 in FIG. 1, which automatically interprets the data from the photomultiplier tube, reads out a converted measurement indicating the radioactivity level to a technician, and adjusts the level of the high voltage supply 17 (e.g., an Ortec 456) as necessary to adapt to the activity level of the specimen in the well 12. The digital signal from the digital volt meter 19 and the digital signal on the lines 2 from the digital electrometer 21 (e.g., a Keithly 195) are fed through a suitable interface 31 (e.g., an IEEE 488 interface) which delivers an output signal on lines 32 to the internal bus 33 of the computer system 30. The pulse count rate (digital) signal on the lines 28 is delivered through an asynchronous interface 35 to the internal data bus 33. A digital output signal on the data bus 33 indicating the desired voltage level of the variable voltage supply 17 is provided to a digital-to-analog converter 36 which supplies a control signal to the power supply 17 proportional to the desired voltage level. Of course, the computer system also includes a central processor unit and associated ROM and RAM memory, illustrated at the block labeled 38, connected to the data bus 33, and disc memory units 39 and input/output devices (e.g., CRT monitor, printer, keyboard, etc.) illustrated at 40 communicating through I/0 ports with the data bus 33.

Figure 2:
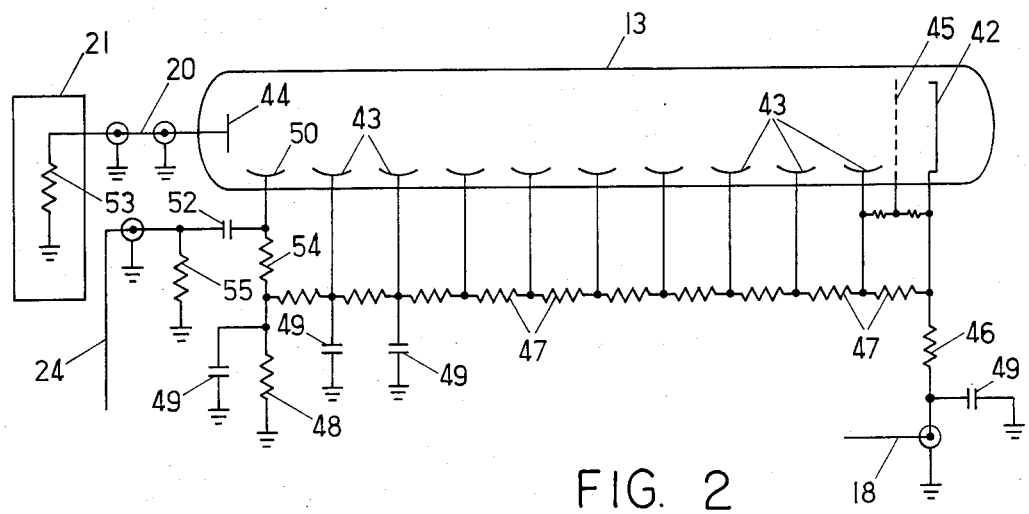
FIG. 2 is a schematic circuit diagram of the photomultiplier tube biasing and detection circuitry.

A schematic circuit diagram of the photomultiplier tube 13 with the associated biasing and signal take-off circuitry is shown in FIG. 2. The photomultiplier tube is of conventional design (e.g., SRC 125BO1, ten stage), having a cathode 42, a series of dynodes 43, an anode 44 and a grid 45. The high voltage from the source 17 is provided on the line 18, shielded for minimization of electromagnetic interference, to the base biasing circuitry of the photomultiplier tube. The base circuitry provides a current path through a current limiting resistor 46, a string of voltage dividing resistors 47, and another series resistor 48 to ground. Each dynode 43 is connected from a tap between the resistors 47 in the string such that each successive dynode, progressing from the cathode 42 toward the anode 44, is at a negative potential closer to ground. Each of the dynodes shown in FIG. 2 will typically provide four electrons for each one striking the dynode, achieving a total amplification over the ten dynodes of about $4^{10}$ Capacitors 49 connected at various points along the base resistor string to ground to suppress high frequency noise. The last dynode, or the dynode closest to the anode 44, designated 50 in FIG. 2, is AC coupled through a capacitor 52 to the shielded line 24 leading to the timing amplifier 25. The dynode 50 is connected to the resistors 47 for biasing at a negative potential by a resistor 54 and the coupling resistor 52 is connected to the ground through a resistor 55. In distinction to the usual biasing structure of photomultiplier tubes, the anode 44 is not connected to the last dynode 50, but is rather connected directly to ground through a resistor 53 within the electrometer or picoammeter 21 by means of the shielded cable 20. In this manner, the voltage pulses from the electrons striking the last dynode 50 may be counted at the same time that the current from the anode 44 is measured. It is also apparent that the voltage pulses at the anode or a dynode other than the last dynode may be counted in accordance with the invention, although counting at the last dynode is preferred.

The input impedance of the electrometer 21, represented by the resistor 53, must be chosen so that the desired potential difference exists between the last dynode 50 and the anode 44. In general, the anode current should not exceed ten percent of the current flowing through the string of bleeder resistors 47 for a passive, resistive voltage divider of the type shown in FIG. 2. It is also preferred that the anode current be limited to less than 1 milliamp to avoid thermal drift and potential damage to the tube. For example, with a resistor string (resistors 46, 47 and 48) having a total series resistance of 10 Megohms, allowable anode current is limited to less than 10 microamps at 1 kilovolt bias voltage applied by the source 17. It is apparent that other voltage division techniques can be utilized to bias the dynodes, such as by using an active network with video transistors to achieve a "stiff" divider, thereby allowing a wider current range.

Figure 3:
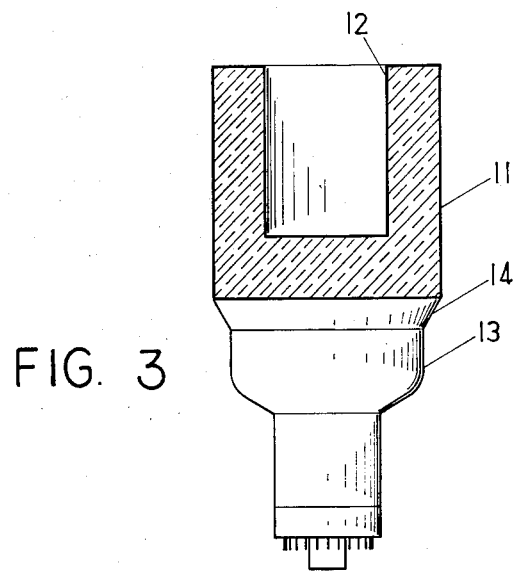
FIG. 3 is an illustrative view, partially in cross section, showing the scintillation well detector mounted on the photomultiplier tube.

The plastic scintillator body 11 is shown in cross-section in FIG. 3, illustrating the cylindrical central well or cavity 12. Preferably, the walls of the scintillator body surrounding the well should be as thick as possible to increase absorption, enhance efficiency and simplify the optics of collecting light at the base of the body from the scintillation light pulses occurring near the open top end. Various materials are suited for forming the scintillator body 11, including plastic scintillator materials, inorganic scintillator crystals (e.g., sodium iodide, cesium fluoride, barium fluoride, bismuth germanate), and liquid scintillators. Plastic scintillator materials are preferred where relatively large well volume is desired at minimum cost and are commercially available (e.g., Bichron, Inc., Pilot). For example, a suitable plastic scintillator has been built with a cylindrical outer diameter of 15 centimeters (cm.) and a height of 15 cm., with a cylindrical well having a diameter of 8 cm. and a depth of 11 cm. The large well can accommodate many radioactive specimens not ordinarily assayable with standard well counters, including small laboratory animals and 250 milliliter flasks. The organic materials scintillate almost entirely due to Compton interactions and no substantial photopeak—of the type found in sodium iodide and other crystal scintillators—is observed. However, the organic scintillators provide adequate resolution and have a photofluorescent decay time (a few nanoseconds) which is much faster than the decay time in NaI (T1) crystals, allowing scintillation pulses to be counted up to the megahertz rate without saturation. This last characteristic enables a substantial overlap (e.g., two decades) of measurement of activities at the high end of the counting mode and at the low end of the current mode. However, the apparatus in accordance with the invention can be utilized with other scintillation materials to provide measurement of activities over different ranges.

The high end of measurement for pulse counting is primarily limited by the ability of available counting circuitry (amplifier 25, timing discriminator 26, frequency counter 27) to count at pulse rates above a few megahertz and ultimately by overlapping of scintillation events where discrete, countable pulses cannot be obtained. The low end of measurement of anode current is reached when the anode current is so small that it cannot be discriminated from noise.

Generally, it has been found that with typical photomultiplier tubes, a biasing voltage from the source 17 of at least 1,000 volts is required to produce millivolt dynode pulses suitable for counting without excessive amplification. The requirement of this relatively high biasing voltage places an upper limit on the ability to count pulses at the last dynode 50 and to measure current simultaneously from the anode (e.g., with 3.8 cm thick scintillator body walls at ten percent efficiency, the upper limit for simultaneous counting and current measurement would be several hundred microcuries, corresponding to about 1 megahertz pulse rate). At such elevated voltages, the current and counting modes typically overlap over approximately two decades of activities (e.g., between 100 nanocuries and 10 microcuries). The minimum detectable activity in the counting mode is limited by the 100 counts per second background activity rate generally resulting from the action of cosmic muons.

If the radioactivity of a sample in the well 12 saturates the detector at the initial high voltage, the anode current can be brought into the linear range of the phototube by decreasing the applied voltage. The calibration constants for a particular radionuclide at a specified voltage can be measured initially with standard sources and archived to be used later to determine the activity of the particular specimen at the selected voltage level. Thus, it will be generally preferable to step the voltage level down in standard increments until the anode current is in its linear range. Similarly, calibration constants can be determined for correcting the counting rate for scintillation events at detected energies well below the maximum energy transfer in Compton collisions. These constants are preferably stored in a look-up table in memory within the computer system 30 and are used by the computer to directly read out activity levels to the technician. Of course, the pulse rate and anode current data may be read directly by the technician who can determine the activity level by using tables of precalculated calibration constants.

It is understood that the invention is not confined to the particular construction and embodiments set forth herein, but embraces such modified forms thereof as come within the scope of the following claims.

What is claimed is:

1. Apparatus for measuring radioactivity over an extended range of activity levels comprising:
   (a) a body of scintillator material;
   (b) a photomultiplier tube mounted adjacent to the scintillator body to receive light flashes therefrom and having an anode, a cathode, and a plurality of dynodes;
   (c) means for biasing the anode, cathode and dynodes of the photomultiplier tube to provide an acceleration voltage for electrons from the cathode across the dynodes to the anode;
   (d) means for selectively measuring the current flowing from the anode of the photomultiplier tube resulting from scintillation events in the scintillator body sufficient to cause a measurable current to flow from the anode; and
   (e) means for selectively counting the rate of electron pulses in the photomultiplier tube resulting from scintillation events in the scintillator body, and wherein the means for measuring anode current and the means for counting the electron pulse rate are capable of doing so simultaneously over an intermeidate rate range of scintillation events.

2. The apparatus of claim 1 wherein the means for measuring anode current and the means for counting electron pulse rate provide digital output signals indicative thereof.

3. The apparatus of claim 1 wherein the means for biasing the anode, cathode and dynodes includes a plurality of series connected resistors and a high voltage source, the series resistors connected between the high voltage source and ground with the cathode connected to the source to be at a negative voltage with respect to any dynode and wherein the output of the anode is connected to ground through a resistance and is otherwise isolated from and at a higher potential than any dynode.

4. The apparatus of claim 1 wherein the scintillator body is formed of a plastic scintillator material and has a cylindrical well into which radioactive specimens can be placed.

5. The apparatus of claim 1 wherein the means for counting includes a timing amplifier connected to receive the voltage pulse signals from a selected dynode through a coupling capacitor, a timing discriminator receiving the output of the timing amplifier, and a frequency counter receiving the output of the timing discriminator and providing a digital output signal indicative of the frequency of pulses.

6. The apparatus of claim 1 wherein the electron pulses are counted by the means for counting by counting the voltage pulses per selected unit of time at the last dynode adjacent to the anode.

7. The apparatus of claim 3 wherein the high voltage source can be adjusted to provide a selected voltage output.

8. Apparatus for measuring the radioactivity of a specimen over an extended range of activity levels comprising:
   (a) a body of plastic scintillator material having a central well into which a radioactive specimen can be placed;
   (b) a photomultiplier tube mounted adjacent to the scintillator body to receive light flashes therefrom and having an anode, a cathode, and a plurality of dynodes;
   (c) means for biasing the anode, cathode and dynodes of the photomultiplier tube to provide an acceleration voltage for electrons from the cathode across the dynodes to the anode, with the anode being at a higher potential than any dynode and electrically isolated therefrom;
   (d) means electrically connected to the anode of the photomultiplier tube for selectively measuring the current flowing from the anode as a result of scintillation events in the scintillator body sufficient to cause a measurable current to flow from the anode; and
   (e) means for selectively counting the pulses of voltage at the last dynode adjacent the anode per selected unit of time to determine the pulse rate resulting from scintillation events in the scintillator body which produce discrete, countable pulses of voltage at the last dynode.

9. The apparatus of claim 8 wherein the means for measuring anode current and the means for counting the pulse rate do so simultaneously over an intermediate rate range of scintillation events.

10. The apparatus of claim 8 wherein the means for measuring anode current and the means for counting pulse rate provide digital output signals indicative thereof.

11. The apparatus of claim 8 wherein the means for biasing the anode, cathode and dynodes includes a plurality of series connected resistors and a high voltage source, the series resistors connected between the high voltage source and ground with the cathode connected to the source to be at a negative voltage with respect to any dynode and wherein the output of the anode is connected to ground through a resistance and is otherwise isolated from and at a higher potential than any dynode.

12. The apparatus of claim 8 wherein the means for counting includes a timing amplifier connected to receive the voltage pulse signals from the last dynode through a coupling capacitor, a timing discriminator receiving the output of the timing amplifier, and a frequency counter receiving the output of the timing discriminator and providing a digital output signal indicative of the frequency of pulses.

13. The apparatus of claim 11 wherein the high voltage source can be adjusted to provide a selected voltage output.

14. A method of determining the radioactivity level of a radioactive specimen comprising the steps of:
   (a) inserting the radioactive specimen into a well formed in a body of plastic scintillator material having a photomultiplier tube mounted adjacent thereto to receive scintillation light flashes therefrom;
   (b) counting the number of voltage pulses produced at a dynode of the photomultiplier tube per selected unit of time to determine the frequency of the scintillation events; and
   (c) simultaneously measuring the current flow from the anode stimulated by scintillation events in the scintillator body to determine the rate of scintillation events.

15. The method of claim 14 including the steps of correlating the counted rate of pulses at the dynode with the magnitude of current flow from the anode and determining an activity level based on the two measurements as compared with a standard source at a known radioactivity level.

16. A method of determining the radioactivity level of a radioactive specimen, comprising the steps of:

(a) inserting the radioactive specimen into a well formed in a body of plastic scintillator material having a photomultiplier tube mounted adjacent thereto to collect the scintillation flashes from the scintillator body;

(b) applying a bias voltage at a selected level across biasing resistors for the cathode and dynodes of the photomultiplier tube to provide an electron accelerating voltage from the cathode across the dynodes to the anode of the photomultiplier tube while electrically isolating the anode from the dynodes;

(c) counting the pulses produced at the last dynode adjacent the anode per selected unit of time to determine the rate of pulses which is thereby proportionally related to the activity level of the specimen if the pulses at the dynode are discrete and can be separately counted;

(d) if the pulses at the last dynode cannot be separately counted, measuring the current flow from the anode to determine a value which is thereby proportionally related to the activity level of the radioactive sample if the photomultiplier tube is not in saturation; and (e) if the photomultiplier tube is saturated at the selected voltage level, decreasing the voltage level until the photomultiplier tube is in its linear range and then measuring the current flow from the anode to determine a value thereby proportionally related to the activity level of the specimen.

17. Apparatus for measuring radioactivity over an extended range of activity levels comprising:

(a) a body of scintillator material;

(b) a photomultiplier tube mounted adjacent to the scintillator body to receive light flashes therefrom and having an anode, a cathode, and a plurality of dynodes;

(c) means for biasing the anode, cathode and dynodes of the photomultiplier tube to provide an acceleration voltage for electrons from the cathode across the dynodes to the anode;

(d) means for selectively measuring the current flowing from the anode of the photomultiplier tube resulting from scintillation events in the scintillator body sufficient to cause a measurable current to flow from the anode; and (e) means for selectively counting the rate of electron pulses in the photomultiplier tube resulting from scintillation events in the scintillator body including a timing amplifier connected to receive the voltage pulse signals from a selected dynode through a coupling capacitor, a timing discriminator receiving the output of the timing amplifier, and a frequency counter receiving the output of the timing discriminator and providing a digital output signal indicative of the frequency of pulses.

* * * * *